(12) United States Patent
Gao (10) Patent No.: US 8,923,629 B2
(45) Date of Patent: Dec. 30, 2014

(54) SYSTEM AND METHOD FOR DETERMINING CO-OCCURRENCE GROUPS OF IMAGES

(75) Inventor: Yuli Gao, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 441 days.

(21) Appl. No.: 13/095,733

(22) Filed: Apr. 27, 2011

(65) Prior Publication Data

US 2012/0275666 A1 Nov. 1, 2012

(51) Int. Cl.
*G06K 9/62* (2006.01)
*G06K 9/00* (2006.01)

(52) U.S. Cl.
CPC .................................. *G06K 9/00677* (2013.01)
USPC ........... 382/225; 382/195; 382/159; 382/190; 382/165; 382/103; 382/170; 382/182; 382/218; 382/176; 382/128; 382/133

(58) Field of Classification Search
CPC .......... G06F 17/30256; G06F 17/3028; G06F 17/3071; G06K 9/00677
USPC ......... 382/225, 195, 159, 190, 165, 103, 170, 382/182, 218, 176, 128, 133
See application file for complete search history.

(56) References Cited

U.S. PATENT DOCUMENTS

| | | | |
|---|---|---|---|
| 6,323,898 B1 | 11/2001 | Koyanagi et al. | |
| 6,324,545 B1 | 11/2001 | Morag | |
| 6,445,810 B2 | 9/2002 | Darrell et al. | |
| 7,035,477 B2 | 4/2006 | Cheatle | |
| 7,133,571 B2 | 11/2006 | Cheatle | |
| 7,203,380 B2 | 4/2007 | Chiu et al. | |
| 7,262,781 B2 | 8/2007 | Balinsky et al. | |
| 7,340,676 B2 | 3/2008 | Geigel et al. | |
| 7,382,903 B2 * | 6/2008 | Ray | 382/118 |
| 7,443,418 B2 | 10/2008 | Bryant et al. | |
| 7,636,450 B1 * | 12/2009 | Bourdev | 382/100 |
| 7,668,405 B2 | 2/2010 | Gallagher | |

(Continued)

FOREIGN PATENT DOCUMENTS

CN 101331522 A 12/2008
JP 2008217479 A 9/2008

(Continued)

OTHER PUBLICATIONS

Jingyu Cui et al; Easyalbum: an Interactive Photo Annotation System Based on Face Clustering and Re-ranking (Research Paper) Publication Date: Apr. 28-May 3, 2007: On pp. 367-376.

(Continued)

*Primary Examiner* — Mike Rahmjoo (57) ABSTRACT

A system and a method are disclosed that determine images with co-occurrence groups of individuals from an image collection. A value of a similarity metric is computed for each pair of images of the image collection, the value of the similarity metric being computed based on a comparison of the number of individuals in common between the images of the pair and the total number of individuals identified in both images of the pair. The collection of images is clustered based on the computed values of the similarity metric. At least one co-occurrence group is determined based on the results of the clustering, where a co-occurrence group is determined as a cluster of images that have a similar combination of individuals.

20 Claims, 4 Drawing Sheets

(56) References Cited

U.S. PATENT DOCUMENTS

| | | | |
|---|---|---|---|
| 8,316,301 | B2 | 11/2012 | Kim et al. |
| 2002/0122067 | A1 | 9/2002 | Geigel et al. |
| 2002/0191861 | A1 | 12/2002 | Cheatle |
| 2003/0072486 | A1* | 4/2003 | Loui et al. ............... 382/175 |
| 2003/0117651 | A1 | 6/2003 | Matraszek et al. |
| 2004/0054659 | A1 | 3/2004 | McIntyre |
| 2004/0120009 | A1 | 6/2004 | White et al. |
| 2004/0187078 | A1 | 9/2004 | Girgensohn |
| 2005/0111737 | A1 | 5/2005 | Das et al. |
| 2005/0165841 | A1 | 7/2005 | Kasperkiewicz et al. |
| 2005/0168779 | A1 | 8/2005 | Tsue et al. |
| 2005/0276477 | A1 | 12/2005 | Lin et al. |
| 2006/0041564 | A1 | 2/2006 | Jain et al. |
| 2006/0074973 | A1 | 4/2006 | Platt et al. |
| 2006/0200758 | A1 | 9/2006 | Atkins |
| 2006/0253491 | A1 | 11/2006 | Gokturk et al. |
| 2006/0257048 | A1 | 11/2006 | Lin et al. |
| 2006/0271691 | A1 | 11/2006 | Jacobs et al. |
| 2006/0279555 | A1 | 12/2006 | Ono |
| 2007/0064121 | A1 | 3/2007 | Issa et al. |
| 2007/0115373 | A1 | 5/2007 | Gallagher et al. |
| 2008/0050039 | A1 | 2/2008 | Jin |
| 2008/0123993 | A1 | 5/2008 | Widdowson |
| 2008/0219564 | A1 | 9/2008 | Covell et al. |
| 2009/0034842 | A1 | 2/2009 | Grosvenor |
| 2009/0034849 | A1 | 2/2009 | Grosvenor |
| 2009/0116752 | A1 | 5/2009 | Isomura et al. |
| 2009/0185723 | A1 | 7/2009 | Kurtz et al. |
| 2010/0066758 | A1 | 3/2010 | Mondry et al. |
| 2010/0156834 | A1* | 6/2010 | Sangster ............... 345/173 |
| 2010/0329550 | A1 | 12/2010 | Cheatle |
| 2010/0329588 | A1 | 12/2010 | Cheatle |
| 2012/0002881 | A1* | 1/2012 | Maeda ............... 382/195 |
| 2012/0106859 | A1 | 5/2012 | Cheatle |

FOREIGN PATENT DOCUMENTS

| | | | |
|---|---|---|---|
| WO | WO-2010047843 | A1 | 4/2010 |
| WO | WO-2010151255 | A1 | 12/2010 |
| WO | WO-2010151257 | A1 | 12/2010 |

OTHER PUBLICATIONS

Matthew Cooper, et al., Temporal event clustering for digital photo collections. ACM Trans. Multimedia Comput. Commun. Appl., 1(3):269 288, 2005.

Tong Zhang, et al., Face based image navigation and search. In MM '09: Proceedings of the seventeen ACM international conference on pp. 597 600, New York, NY, USA, 2009. AC.

Collins-Thompson et al., "A Clustering-based Algorithm for Automatic Document Separation," Proceedings of the SIGIR 2002 Workshop on Information Retrieval and OCR, 2002, 5 pages.

Atkins, C. Brian, "Blocked Recursive Image Composition," Proceedings of the 16th ACM international conference on Multimedia, Oct. 26, 2008, pp. 821-824.

Collins-Thompson et al. "Clustering-based Algorithm for Automatic Document Separation, "Proceedings of the SIGIR 2002 Workshop on Information Retrieval and OCT, 2002, 5 pages.

Dave Grosvenor, "The use of a cast to generate person-biased photo-albums," HP Laboratories Bristol, 2007, <htt://www.hpl.hp.com/techreports/2007/HPL-2007-12.pfd>.

Extended European Search Report for European patent application No. 09846629, Jan. 31, 2013, 10 pages.

Extended European Search Report received for EP Application No. 09846630, dated Nov. 20, 2012, 7 pages.

Grosvenor et al., "Using the emphasis statistics of a cast for the automatic layout of a photo-album," HP Laboratories Bristol, 2007 <http://www.hlp.hp.com/techreports/2007/HPL-2007-52.pdf>.

Hewlett Packard Development Company, L.P. "Frustration-free photo books, " (Web page), Oct. 2009, <http://www.hpl.hp.com/2009/oct-dec/magicphotobook.html>.

International Preliminary Report on Patentability received for PCT Application No. PCT/US2009/048388.

International Preliminary Report on Patentability received for PCT Application No. PCT/US2009/048403, Jan. 12, 2012, 8 pages.

International Preliminary Report on Patentability received for PCT Application No. PCT/US2009/048403, Mar. 11, 2010, 13 pages.

International Search Report and Written Opinion received for PCT Application No. PCT/US2009/048388, Mar. 17, 2010, 12 pages.

Snapfish by HP, "Photo Books, " Help, (Web Page), Aug. 18, 2007, <http://web.archive.org/web/20070818022213/http://www.snapfish.com/helpphotobooks>.

Wallick et al., "Automatic Organization of Photograph Collections," Mar. 30, 2007, <http://pages.cs.wisc.edu/~michaelw/papers/uist07.pdf>, 8 pages.

Xiao et al., "Mixed-initiative photo collage authoring, " Proceedings of the 16th ACM International Conference on Multimedia, ACM, Oct. 2008, pp. 509-518, <http://www.hpl.hp.com/techreports/2008/HPL-2008-199.pdf>.

Jingyu Cui et al; Easyalbum: an Interactive Photo Annotaion System Based on Face Clustering and Re-ranking (Research Paper) Publication Date: Apr. 28-May 3, 2007: On pp. 367-376.

Matthew Cooper et al., Temporal event clustering for digital photo collections. ACM Trans. Multimedia Comput. Commun. Appl., 1(3):269 288, 2005.

Tong Zhang, et al., Face based image navigation and search. In MM '09: Proceedings of the seventeen ACM international conference on pp. 597 600, New York, NY, USA, 2009. AC.

A. Gallagher and T. Chen, "Clothing cosegmentation for recognizing people," IEEE Conf. on Computer Vision and Pattern Recognition, 2008, CVPR 2008, Jun. 2008, pp. 1-8.

J. Winn, A. Criminisi, and T. Minka, "Object Categorization by Learned Universal Visual Dictionary," ICCV, 2005.

N Dalal and B. Triggs, "Histograms of Oriented Gradients for Human Detection, " IEEE Conference on Computer Vision and Pattern Recognition, 2005.

Office Action received in U.S. Appl. No. 12/491,087, Dec. 6, 2011, 7 pages.

Office Action received in U.S. Appl. No. 13/380,027, Apr. 17, 2014, 29 pages.

Office Action received in U.S. Appl. No. 13/380,027, Aug. 29, 2013, 20 pages.

Office Action received in U.S. Appl. No. 13/380,027, Dec. 18, 2013, 23 pages.

Office Action received in U.S. Appl. No. 13/380,030, Mar. 4, 2014, 11 pages.

Office Action received in U.S. Appl. No. 13/380,030, Oct. 30, 2013, 16 pages.

P. Viola and M. Jones, "Rapid Object Detection Using a Boosted Cascade of Simple Features," IEEE Conf. Computer Vision Pattern Recognition, 2001.

T. Cour, F. Benezit, and J. Shi, "Spectral Segmentation with Multiscale Graph Decompsition, " CVPR, 2005.

W. Geo, H. Ai and S. Lao, "Adaptive contour features in oriented granular space for human detection and segmentation," IEEE Conf. on Computer Vision and Pattern Recognition, 2009, CVPR 2009, Jun. 2009, pp. 1786-1793.

X. Bai, Q. Li, L. Latecki, W. Liu and Z. Tu, "Shape band: a deformable object detection approach,"IEEE Conf. on Computer Vision and Pattern Recognition, 2009 CVPR 2009, Jun. 2009, pp. 1335-1342.

Y. Song and T. Leung, "Context-aided human recognition—clustering," European Conference on Computer Vision, 2006, Computer Vision-ECCV 2006, pp. 382-395.

Final Office Action received in U.S. Appl. No. 13/380,027, Aug. 4, 2014, 16 pages.

* cited by examiner

SYSTEM AND METHOD FOR DETERMINING CO-OCCURRENCE GROUPS OF IMAGES

BACKGROUND

In a social gathering or other gathering or association, some people are captured with each other in many images, while others remain distant from each other (and are captured together in fewer images). This behavior can reflects the underlying social relationships between different sub-groups of people. A tool that facilitates identification of different social combinations and associations of people would be beneficial.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

An "image" broadly refers to any type of visually perceptible content that may be rendered on a physical medium (e.g., a display monitor or a print medium). Images may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image.

A "computer" is any machine, device, or apparatus that processes data according to computer-readable instructions that are stored on a computer-readable medium either temporarily or permanently. A "software application" (also referred to as software, an application, computer software, a computer application, a program, and a computer program) is a set of machine-readable instructions that a computer can interpret and execute to perform one or more specific tasks. A "data file" is a block of information that durably stores data for use by a software application.

The term "computer-readable medium" refers to any medium capable storing information that is readable by a machine (e.g., a computer system). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

As used herein, the term "includes" means includes but not limited to, the term "including" means including but not limited to. The term "based on" means based at least in part on.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one example, but not necessarily in other examples. The various instances of the phrase "in one embodiment" or similar phrases in various places in the specification are not necessarily all referring to the same embodiment.

Described herein are novel systems and methods for determining images with co-occurrence groups of individuals from an image collection. Images with different people are captured because different people combinations can reflect different underlying social relationships. The systems and methods herein facilitate identifying the important co-occurrence groups, and can be used to support efficient relationship-based browsing in a database of images, and summarization of large image collections (such as but not limited to family photo collections). The identification of people co-occurrences is cast into an image clustering approach, where the similarity of any two images is defined as the "commonality" of the people appear in the two images.

In an example system and method herein, a value of a similarity metric is computed for each pair of images of the image collection, the value of the similarity metric being computed based on a comparison of the number of individuals in common between the images of the pair and the total number of individuals identified in both images of the pair. The collection of images is clustered based on the computed values of the similarity metric. At least one co-occurrence group is determined based on the results of the clustering. A co-occurrence group is determined as a cluster of images that have a similar combination of individuals.

In an example, the systems and methods described herein facilitate identification of different social combinations and associations of people. For example, in a social gathering, some people may come together to enjoy each others' company and may take a lot of pictures with each other. Others may remain distant from each other, and appear in fewer images together in the image collection. This behavior can reflect the underlying social relationships between different sub-groups of people. Different people may take pictures together for different purposes. The act of taking pictures together can indicate some important relationships among people. A system and method described herein can be used to automatically identify the different social combinations and associations of individuals. A system and method described herein can be used to provide an intuitive, social relationship based image organization tool.

In an example, a system and method herein facilitate image browsing and summarization that is not based mainly on time of image capture or on the individuals in images. In an example, a system and method herein facilitate browsing photos and other images by automatically discovered people co-occurrence groups.

Figure 1A:
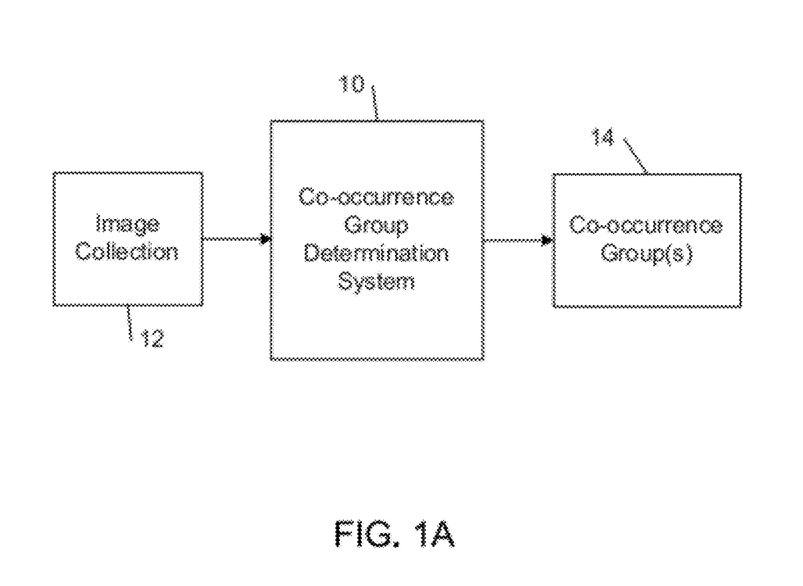
FIG. 1A is a block diagram of an example of a co-occurrence group determination system for determining co-occurrence groups of images.

FIG. 1A shows an example of a co-occurrence group determination system 10 that determines co-occurrence groups 14 of images from image collection 12. The co-occurrence group determination system 10 receives image data representative of image collection 12, and, according to example methods described herein, determines co-occurrence groups 14 of images from image collection 12. The input to the co-occurrence group determination system 10 also can be several collections of images for each of which co-occurrence groups of images are determined.

An example source of images is personal photos of a consumer taken of family members and/or friends. As non-limiting examples, the images can be photos taken during an event (e.g., wedding, christening, birthday party, etc.), a holiday celebration (Christmas, July 4, Easter, etc.), a vacation, or other occasion. Another example source is images captured by an image sensor of, e.g., entertainment or sports celebrities, or reality television individuals. The images can be taken of one or more members of a family near an attraction at an amusement park. In an example use scenario, a system and method disclosed herein is applied to images in a database of images, such as but not limited to images captured using imaging devices (such as but not limited to surveillance devices, or film footage) of an area located at an airport, a stadium, a restaurant, a mall, outside an office building or residence, etc. In various examples, each image collection can be located in a separate folder in a database, or distributed over several folders. It will be appreciated that other sources are possible.

Figure 1B:
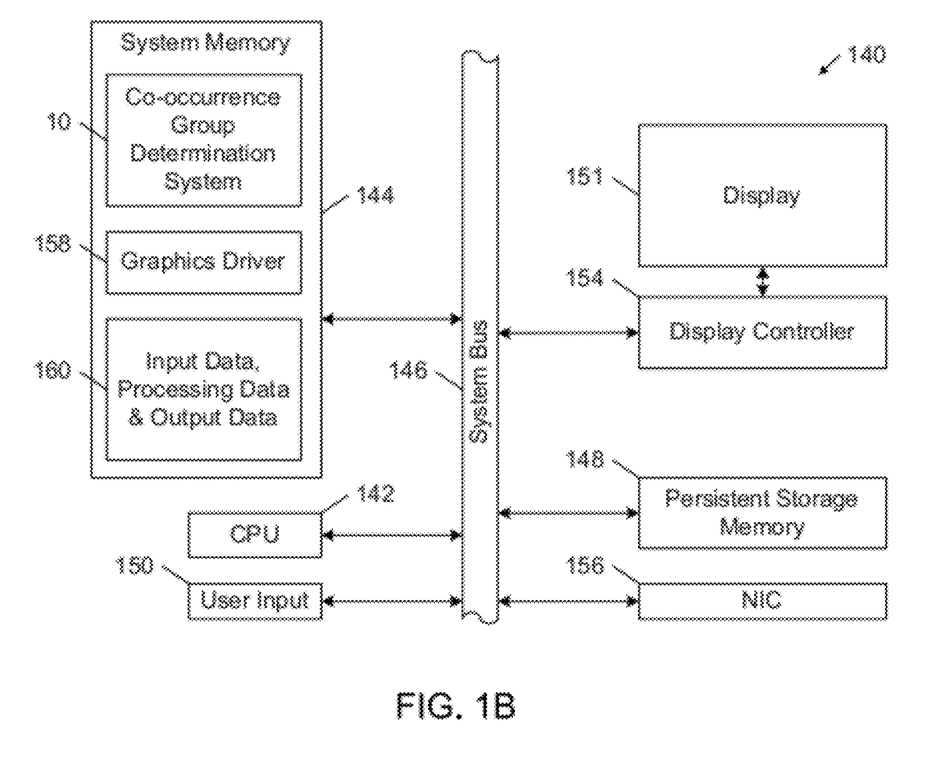
FIG. 1B is a block diagram of an example of a computer system that incorporates an example of the co-occurrence group determination system of FIG. 1A.

FIG. 1B shows an example of a computer system 140 that can implement any of the examples of the co-occurrence group determination system 10 that are described herein. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer system 140 using one or more input devices 150 (e.g., a keyboard, a computer mouse, a microphone, joystick, and touch pad). Information may be presented through a user interface that is displayed to a user on the display 151 (implemented by, e.g., a display monitor), which is controlled by a display controller 154 (implemented by, e.g., a video graphics card). The computer system 140 also typically includes peripheral output devices, such as speakers and a printer. One or more remote computers may be connected to the computer system 140 through a network interface card (NIC) 156.

As shown in FIG. 1B, the system memory 144 also stores the co-occurrence group determination system 10, a graphics driver 158, and processing information 160 that includes input data, processing data, and output data. In some examples, the co-occurrence group determination system 10 interfaces with the graphics driver 158 to present a user interface on the display 151 for managing and controlling the operation of the co-occurrence group determination system 10.

The co-occurrence group determination system 10 can include discrete data processing components, each of which may be in the form of any one of various commercially available data processing chips. In some implementations, the co-occurrence group determination system 10 is embedded in the hardware of any one of a wide variety of digital and analog computer devices, including desktop, workstation, and server computers. In some examples, the co-occurrence group determination system 10 executes process instructions (e.g., machine-readable instructions, such as but not limited to computer software and firmware) in the process of implementing the methods that are described herein. These process instructions, as well as the data generated in the course of their execution, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

The principles set forth in the herein extend equally to any alternative configuration in which co-occurrence group determination system 10 has access to image collection 12. As such, alternative examples within the scope of the principles of the present specification include examples in which the co-occurrence group determination system 10 is implemented by the same computer system, examples in which the functionality of the co-occurrence group determination system 10 is implemented by a multiple interconnected computers (e.g., a server in a data center and a user's client machine), examples in which the co-occurrence group determination system 10 communicates with portions of computer system 140 directly through a bus without intermediary network devices, and examples in which the co-occurrence group determination system 10 has a stored local copies of image collection 12.

Figure 2:
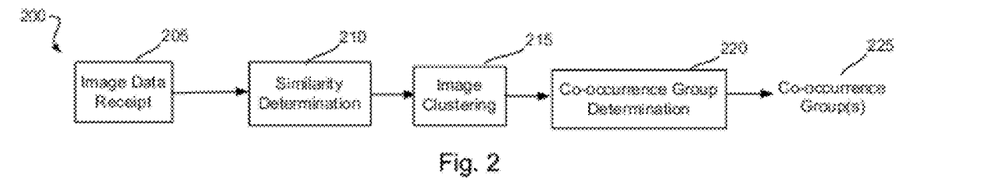
FIG. 2 is a block diagram of an example functionality implemented by an illustrative computerized co-occurrence group determination system.

Referring now to FIG. 2, a block diagram is shown of an illustrative functionality 200 implemented by co-occurrence group determination system 10 for determining co-occurrence groups of images, consistent with the principles described herein. Each module in the diagram represents an element of functionality performed by the processing unit 142. Arrows between the modules represent the communication and interoperability among the modules. In brief, image data representative of images in an image collection is received in block 205, values of a similarity metric for pairs of images from the image collection are determined in block 210 using the image data, image clustering is performed in block 215 on the image collection based on the computed values of the similarity metric, and co-occurrence groups are determined in block 220 to provide the co-occurrence groups 225.

Referring to block 205, image data representative of images in an image collection is received. Examples of image data representative of images include pixel value and pixel coordinates relative to the image.

Referring to block 210, values of a similarity metric for pairs of images from the image collection are determined by a module based on the image data. The value of the similarity metric can be computed based on a comparison of the number of individuals in common between the images of the pair and the total number of individuals identified in both images of the pair.

A non-limiting example of a similarity metric determination is as follows. An image collection of N images can be represented as $C=\{p_i\}_{i=1}^{N}$, where each image $p_i$ of the image collection includes a set of individuals with faces represented by $$\{f_j^{p_i}\}_{j=1}^{n_{p_i}}.$$

The identity of each face can be denoted as $I(f_j^{p_i})$. The faces can be identified automatically using a face clustering technique (and associated algorithm). We define the similarity metric between two images can be determine according to the following:

$$Sim(p_a, p_b) = \frac{|\{I(f_j^{p_a})\} \cap \{I(f_j^{p_b})\}|}{|\{I(f_j^{p_a})\} \cup \{I(f_j^{p_b})\}|}$$

where $p_a$ and $p_b$ are images in each pair, and $\{I(f_j^{p_i})\}$ represents the set of face of individuals identities in image $p_i$. The numerator $|\{I(f_j^{p_a})\} \cap \{I(f_j^{p_b})\}|$ represents the cardinality of the intersection of the two sets of identified individuals, and indicates the number of individuals in common between the images of the pair. The denominator $|\{I(f_j^{p_a})\} \cup \{I(f_j^{p_b})\}|$ represents the cardinality of the union of the two sets of identified individuals, and indicates the total number of individuals identified in both images of the pair. This example similarity metric is bounded in [0,1]. The lower bound is achieved when no common people appear in the two images. The upper bound is achieved when people appeared in these two images are exactly the same.

Other non-limiting examples of similarity metrics that can be used to compare the number of individuals in common between the images of the pair and the total number of individuals identified in both images of the pair include distance metrics such as the Euclidean distance (also called the 2-norm distance), the squared Euclidean distance, the Manhattan distance (also called the 1-norm distance), and the maximum norm (also called the infinity norm).

Image clustering is performed in block 215 by a module on the image collection based on the computed values of the similarity metric. Using the results of the similarity metric computation, a clustering technique (and associated algorithm) can be implemented. Non-limiting examples of applicable clustering analysis include a hierarchical clustering analysis, such as an agglomerative hierarchical clustering, or a partitional clustering analysis, such as k-means clustering, fuzzy c-means clustering, or quality threshold (QT) clustering. In an example, the image clustering module applies an unsupervised machine learning tool for clustering the image collection using the similarity metric. A result of the image clustering of block 215 is the identification of image clusters, each image cluster including images with similar people combinations.

In block 220, co-occurrence groups are determined, based on the image clusters identified in block 215, to provide the co-occurrence groups 225. In an example, the identified image clusters can be ranked according to their size to identify co-occurrence groups with popular combinations of individuals. In this example implementation, image clusters that include images with the popular combinations of individuals would appear in the larger sized image clusters of the ranking. In another example, the identified image clusters can be ranked according to the popularities of the individuals appearing in the images of the image cluster to identify co-occurrence groups with combinations of popular individuals. In this example implementation, image clusters that include images with combination of the popular individuals would appear in the higher ranked image clusters according to individual's popularity. The popularity of an individual can be determined based on the frequency or number of appearances of the individual in the image collection. In an example, the frequency or number of appearances of an individual can be determined using the same face clustering technique (and associated algorithm) that is used to identify individuals in the images. The ranking of image clusters according to individual's popularity can be performed based on a combination of the popularities of individuals within the images. Non-limiting examples of the combination of the popularities include determining a sum, a weighted sum, or other linear combination, of the popularities.

Figure 3:
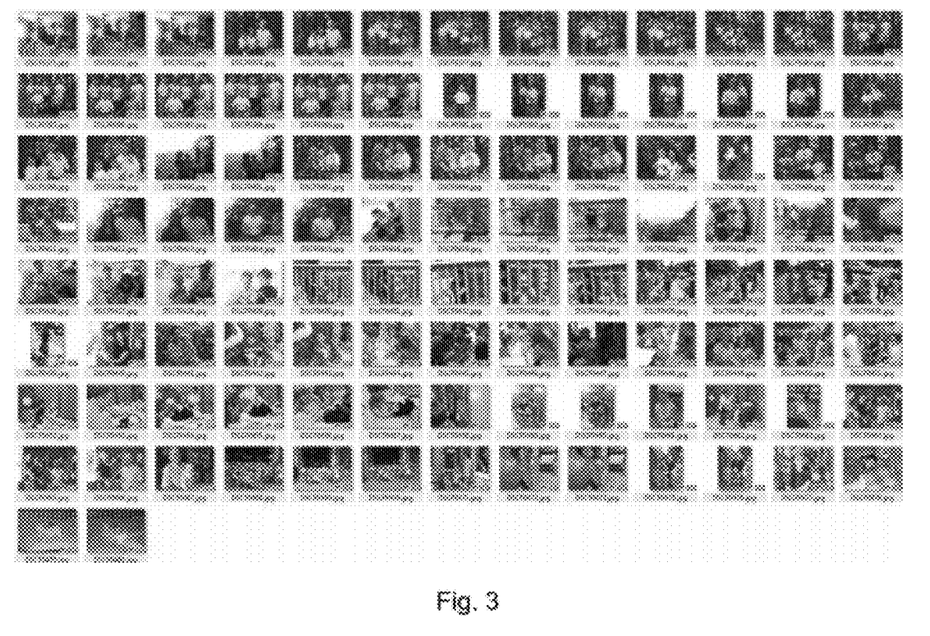
FIG. 3 is an example image collection.
Figure 4A:
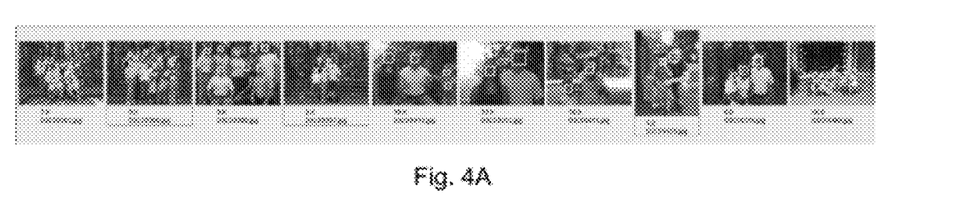
FIG. 4A shows example output of the top ten people combinations selected from the image collection of FIG. 3.

The results of an example implementation according to a system and method herein is described. FIG. 3 shows an example image collection to which a system and method are applied to identify co-occurrence groups. The example image collection contains 106 images captured at a family gathering event. In this implementation, the identified image clusters are ranked according to the popularities of the individuals appearing in the images of the image cluster to identify co-occurrence groups with combinations of popular individuals. The top ten (10) people combinations, determined according to the principles herein, are shown in FIG. 4A. In this example, the ranking metric is computed as the sum of the popularities of the individuals in the images. The rectangles drawn on people combinations in FIG. 4A are used to indicate that there are more than one instances of such people combinations found in the image collection. Example of instances of such people combinations are shown in FIG. 4B.

Figure 4B:
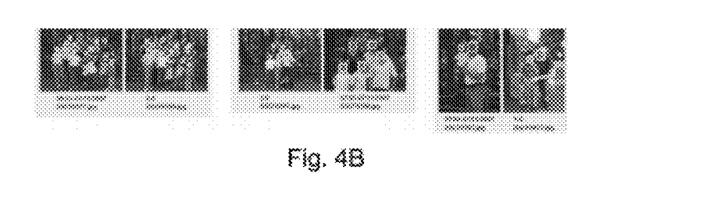
FIG. 4B shows example output of different people combinations selected from the image collection of FIG. 3.

The example implementation of FIGS. 3, 4A and 4B demonstrate that a system and method according to the principles herein can be applied to various applications, such as relationship-based photo browsing (where images are grouped by people combinations), and collection summarization using image groups obtained from the top N people combinations.

In a non-limiting example implementation, the co-occurrence group(s) of images determined according to the principles herein are presented to a user that wants a preview of the contents of a folder or other portion of a database. For example, a functionality can be implemented on a computerized apparatus, such as but not limited to a computer or computing system of a desktop or mobile device (including hand-held devices like smartphones), where a user is presented with the co-occurrence group(s) of images in a folder when the user rolls a cursor over the folder. In another example, the systems and methods herein can be a functionality of a computerized apparatus, such as but not limited to a computer or computing system of a desktop or mobile device (including hand-held devices like smartphones), that is executed on receiving a command from a user or another portion of the computerized apparatus to present a user with the co-occurrence group(s) of images in a folder.

Figure 5:
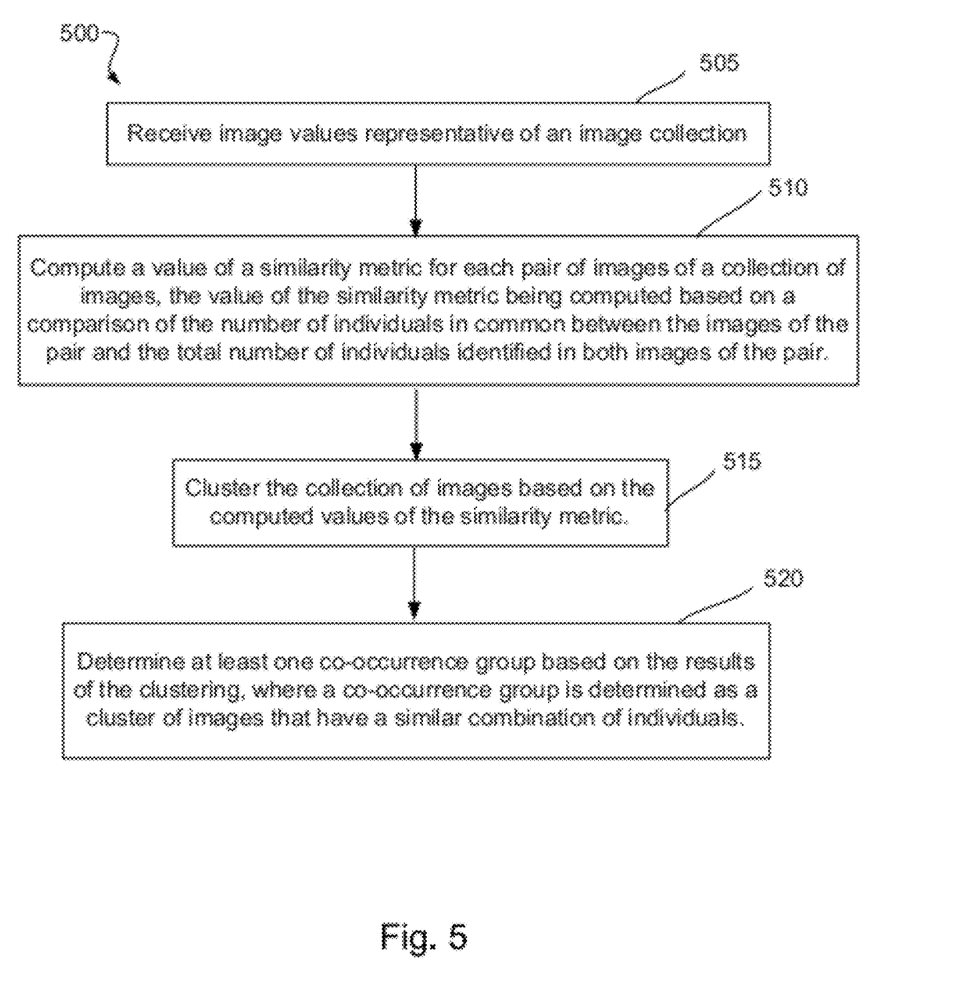
FIG. 5 shows a flow chart of an example process for determining co-occurrence groups of images.

FIG. 5 shows a flow chart of an example process 500 for determining co-occurrence groups of images from an image collection. The processes of FIG. 5 can be performed by modules as described in connection with FIG. 2. In block 505, image data representative of images from a collection of images is received. In block 510, a value of a similarity metric is computed for each pair of images of a collection of images, the value of the similarity metric being computed based on a comparison of the number of individuals in common between the images of the pair and the total number of individuals identified in both images of the pair. In block 515, the collection of images is clustered based on the computed values of the similarity metric. In block 520, at least one co-occurrence group is determined based on the results of the clustering, wherein a co-occurrence group is determined as a cluster of images that have a similar combination of individuals.

Many modifications and variations of this invention can be made without departing from its spirit and scope, as will be apparent to those skilled in the art. The specific examples described herein are offered by way of example only, and the invention is to be limited only by the terms of the appended claims, along with the full scope of equivalents to which such claims are entitled.

As an illustration of the wide scope of the systems and methods described herein, the systems and methods described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

All references cited herein are incorporated herein by reference in their entirety and for all purposes to the same extent as if each individual publication or patent or patent application was specifically and individually indicated to be incorporated by reference in its entirety herein for all purposes. Discussion or citation of a reference herein will not be construed as an admission that such reference is prior art to the present invention.

What is claimed is:

1. A method performed by a physical computer system comprising at least one processor, said method comprising:
    computing a value of a similarity metric for each pair of images of a collection of images, the value of the similarity metric being computed based on a comparison of the number of individuals in common between the images of the pair and the total number of individuals identified in both images of the pair;
    clustering the collection of images based on the computed values of the similarity metric; and
    determining at least one co-occurrence group based on the results of the clustering, wherein a co-occurrence group is determined as a cluster of images that have a similar combination of individuals.

2. The method of claim 1, wherein at least two co-occurrence groups are determined, and wherein the method further comprises: ranking the co-occurrence groups according to the size of the cluster; and determining the highest ranked cluster as the co-occurrence group having a popular combination of individuals.

3. The method of claim 1, wherein at least two co-occurrence groups are determined, and wherein the method further comprises: ranking the co-occurrence groups according to values of popularity of the individuals appearing in the cluster; and determining the highest ranked cluster as the co-occurrence group having combinations of popular individuals.

4. The method of claim 3, wherein the values of popularity of the individuals in the images is determined based on applying a face clustering technique to the image collection.

5. The method of claim 4, wherein ranking the co-occurrence groups according to the values of popularity of the individuals appearing in the cluster comprises determining a combination of the values of popularity of individuals in the images in the clusters; and ranking the clusters based on values of combined popularities.

6. The method of claim 5, wherein the values of combined popularities are computed as the sum of the values of popularity of the individuals in the image.

7. The method of claim 1, further comprising computing the similarity metric according to:

$$Sim(p_a, p_b) = \frac{|\{I(f_j^{P_a})\} \cap \{I(f_j^{P_b})\}|}{|\{I(f_j^{P_a})\} \cup \{I(f_j^{P_b})\}|}$$

wherein $p_a$ and $p_b$ are images in each pair, $I(f_j^{P_i})$ is the identity of the identified individual in each image, $\{I(f_j^{P_i})\}$ is the set of identified individual in the images, $|\{I(f_j^{P_a})\} \cap \{I(f_j^{P_b})\}|$ is the cardinality of the intersection of the two sets of identified individuals, and $|\{I(f_j^{P_a})\} \cup \{I(f_j^{P_b})\}|$ is the cardinality of the union of the two sets of identified individuals.

8. A computerized apparatus, comprising:
    a memory storing computer-readable instructions; and
    a processor coupled to the memory, to execute the instructions, and based at least in part on the execution of the instructions, to:
        compute a value of a similarity metric for each pair of images of a collection of images, the value of the similarity metric being computed based on a comparison of the number of individuals in common between the images of the pair and the total number of individuals identified in both images of the pair;
        cluster the collection of images based on the computed values of the similarity metric; and
        determine at least one co-occurrence group based on the results of the clustering, wherein a co-occurrence group is determined as a cluster of images that have a similar combination of individuals.

9. The apparatus of claim 8, wherein the instructions to determine at least one co-occurrence group based on the results of the clustering comprises instructions to:
    determine at least two co-occurrence groups;
    rank the co-occurrence groups according to the size of the cluster; and
    determine the highest ranked cluster as the co-occurrence group having a popular combination of individuals.

10. The apparatus of claim 8, wherein the instructions to determine at least one co-occurrence group based on the results of the clustering comprises instructions to:
    determine at least two co-occurrence groups;

ranking the co-occurrence groups according to the values of popularity of the individuals appearing in the cluster; and determine the highest ranked cluster as the co-occurrence group having combinations of popular individuals.

11. The apparatus of claim 10, further comprising instructions to determine the values of popularity of the individuals in the images based on applying a face clustering technique to the image collection.

12. The apparatus of claim 11, wherein the instructions to rank the co-occurrence groups according to the values of popularity of the individuals appearing in the cluster comprises instructions to determine a combination of the values of popularity of individuals in the images in the clusters; and rank the clusters based on the values of combined popularities.

13. The apparatus of claim 8, wherein the instructions to compute a value of a similarity metric for each pair of images of a collection of images further comprises instructions to compute the similarity metric according to:

$$Sim(p_a, p_b) = \frac{|\{I(f_j^{p_a})\} \cap \{I(f_j^{p_b})\}|}{|\{I(f_j^{p_a})\} \cup \{I(f_j^{p_b})\}|}$$

wherein $p_a$ and $p_b$ are images in each pair, $I(f_j^{p_i})$ is the identity of the identified individual in each image, $\{I(f_j^{p_i})\}$ is the set of identified individual in the images, $|\{I(f_j^{p_a})\} \cap \{I(f_j^{p_b})\}|$ is the cardinality of the intersection of the two sets of identified individuals, and $|\{I(f_j^{p_a})\} \cup \{I(f_j^{p_b})\}|$ is the cardinality of the union of the two sets of identified individuals.

14. The apparatus of claim 8, wherein the processor is in a computer, a computing system of a desktop device, or a computing system of a mobile device.

15. A non-transitory computer-readable storage medium, comprising instructions executable to:
compute a value of a similarity metric for each pair of images of a collection of images, the value of the similarity metric being computed based on a comparison of the number of individuals in common between the images of the pair and the total number of individuals identified in both images of the pair;
cluster the collection of images based on the computed values of the similarity metric; and
determine at least one co-occurrence group based on the results of the clustering, wherein a co-occurrence group is determined as a cluster of images that have a similar combination of individuals.

16. The non-transitory computer-readable storage medium of claim 15, wherein the instructions to determine at least one co-occurrence group based on the results of the clustering comprises instructions to:
determine at least two co-occurrence groups;
rank the co-occurrence groups according to the size of the cluster; and
determine the highest ranked cluster as the co-occurrence group having a popular combination of individuals.

17. The non-transitory computer-readable storage medium of claim 15, wherein the instructions to determine at least one co-occurrence group based on the results of the clustering comprises instructions to:
determine at least two co-occurrence groups;
ranking the co-occurrence groups according to the values of popularity of the individuals appearing in the cluster; and
determine the highest ranked cluster as the co-occurrence group having combinations of popular individuals.

18. The non-transitory computer-readable storage medium of claim 17, further comprising instructions to determine the values of popularity of the individuals in the images based on applying a face clustering technique to the image collection.

19. The non-transitory computer-readable storage medium of claim 18, wherein the instructions to rank the co-occurrence groups according to the values of popularity of the individuals appearing in the cluster comprises instructions to determine a combination of the values of popularity of individuals in the images in the clusters; and rank the clusters based on the values of combined popularities.

20. The non-transitory computer-readable storage medium of claim 15, wherein the instructions to compute a value of a similarity metric for each pair of images of a collection of images further comprises instructions to compute the similarity metric according to:

$$Sim(p_a, p_b) = \frac{|\{I(f_j^{p_a})\} \cap \{I(f_j^{p_b})\}|}{|\{I(f_j^{p_a})\} \cup \{I(f_j^{p_b})\}|}$$

wherein $p_a$ and $p_b$ are images in each pair, $I(f_j^{p_i})$ is the identity of the identified individual in each image, $\{I(f_j^{p_i})\}$ is the set of identified individual in the images, $|\{I(f_j^{p_a})\} \cap \{I(f_j^{p_b})\}|$ is the cardinality of the intersection of the two sets of identified individuals, and $|\{I(f_j^{p_a})\} \cup \{I(f_j^{p_b})\}|$ is the cardinality of the union of the two sets of identified individuals.

* * * * *